(12) United States Patent
Chang et al.

(10) Patent No.: US 9,327,802 B1
(45) Date of Patent: May 3, 2016

(54) EXTENDED AND LOWERED FRAME ARRANGEMENT FOR MOTORCYCLE

(71) Applicants: Liang Chang, Fontana, CA (US); Xin Hua Chen, Fontana, CA (US)

(72) Inventors: Liang Chang, Fontana, CA (US); Xin Hua Chen, Fontana, CA (US)

( * ) Notice: Subject to any disclaimer, the term of this patent is extended or adjusted under 35 U.S.C. 154(b) by 0 days.

(21) Appl. No.: 14/949,885

(22) Filed: Nov. 24, 2015

Related U.S. Application Data

(63) Continuation of application No. 14/922,116, filed on Oct. 24, 2015.

(51) Int. Cl.
| | | |
|---|---|---|
| *B62M 7/04* | (2006.01) | |
| *B62K 11/04* | (2006.01) | |
| *B62K 21/02* | (2006.01) | |
| *B62K 25/04* | (2006.01) | |
| *B62M 7/06* | (2006.01) | |

(52) U.S. Cl.
CPC .................. *B62M 7/04* (2013.01); *B62K 11/04* (2013.01); *B62K 21/02* (2013.01); *B62K 25/04* (2013.01); *B62M 7/06* (2013.01); *B62K 2202/00* (2013.01)

(58) Field of Classification Search
CPC ......... B62K 11/00; B62K 11/02; B62K 11/04
See application file for complete search history.

(56) References Cited

U.S. PATENT DOCUMENTS

| | | | | |
|---|---|---|---|---|
| 1,164,122 A * | 12/1915 | St. Ives | .................. | B62K 11/04 180/219 |
| 2,286,575 A * | 6/1942 | Ronning | ................ | B62K 11/00 180/313 |
| 3,016,967 A * | 1/1962 | Rehfeld | .................. | B60B 19/14 152/109 |
| 4,721,178 A * | 1/1988 | Ito | ............................ | B62M 7/06 180/215 |
| 4,984,650 A * | 1/1991 | Horiike | .................. | B62K 11/04 180/227 |
| 6,679,345 B2 * | 1/2004 | Hirayama | ........... | B60L 11/1881 180/220 |
| 6,854,551 B2 * | 2/2005 | Wisecarver | .......... | B62D 31/006 180/208 |
| 9,156,342 B2 * | 10/2015 | Annaberger et al. | .... | B60K 1/04 |
| 2007/0235977 A1 * | 10/2007 | Cleland | .................. | B62K 11/04 280/281.1 |
| 2008/0277181 A1 * | 11/2008 | Alsop | .................... | B62K 11/04 180/219 |
| 2013/0180792 A1 * | 7/2013 | Toftner | .............. | A62B 18/0006 180/219 |
| 2013/0270021 A1 * | 10/2013 | Kubanek | ................ | B62K 11/00 180/220 |
| 2013/0277132 A1 * | 10/2013 | Kawatani | ............... | B62K 11/02 180/220 |
| 2013/0299265 A1 * | 11/2013 | Marazzi | .................... | B60K 1/04 180/220 |

* cited by examiner

*Primary Examiner* — Kevin Hurley
(74) *Attorney, Agent, or Firm* — David and Raymond Patent Firm; Raymond Y. Chan

(57) ABSTRACT

A motorcycle includes an extended and lower frame arrangement, a front wheel coupled to the extended and lower frame arrangement via a front wheel extension member to frontwardly extend a distance between the extended and lower frame arrangement and the front wheel, a rear wheel coupled to the extended and lower frame arrangement via a widen hub assembly to rearwardly extend a distance between the extended and lower frame arrangement and the rear wheel, such that the front wheel and the rear wheel are shifted far from the extended and lowered frame arrangement to lengthen a distance between the front wheel and the rear wheel so as to further lower a center of gravity of the motorcycle.

20 Claims, 10 Drawing Sheets

EXTENDED AND LOWERED FRAME ARRANGEMENT FOR MOTORCYCLE

CROSS REFERENCE OF RELATED APPLICATION

This is a Continuation application that claims the benefit of priority under 35U.S.C. §119 to a non-provisional application Ser. No. 14/922,116, filed Oct. 24, 2015.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a motorcycle, and more particularly to an extended and lowered frame arrangement of a motorcycle, wherein the front and rear wheel assemblies are further extended frontwardly and rearwardly from the extended and lowered frame arrangement and the engine is re-arranged to further lower the center of gravity of the motorcycle.

2. Description of Related Arts

A motor scooter is a motorcycle comprising a step-through frame defining a floorboard, a seat supported by the step-through frame, an engine supported behind the floorboard, and two small wheels mounted at front and rear portions of the step-through frame. The scooter is a practical and accessible form of transportation to solve the parking and traffic problems in crowed cities. Therefore, many riders would like to modify the scooter to enhance the riding quality thereof.

A modified scooter, such as "Honda Ruckus", has been successful in form of a good looking, rugged style, practical, and off-road inspired scooter. The design of the modified scooter is to lower the center of gravity thereof in order to enhance the handling of the scooter. However, the modified scooter still has several drawbacks. Firstly, the engine is suspended and dropped down at a position that the bottom side of the engine is below the floorboard. Due to the low center of gravity of the scooter, the bottom side of the engine will be hit by any external object during driving. The suspended structure of the engine requires substantially complicated mounting structure to the frame to secure the engine at the frame. Secondly, the suspension system is directly mounted under the seat to minimize the vibration from the engine. However, the vibration from the wheels may transmit to the seat through the frame to reduce the riding quality of the scooter. In addition, the distance between the front and rear wheels is limited by the frame and the front fork. Accordingly, the entire structure of the scooter is complicated to modify and to enhance the riding quality of the scooter.

SUMMARY OF THE PRESENT INVENTION

The invention is advantageous in that it provides an extended and lowered frame arrangement for a motorcycle, wherein the front and rear wheel assemblies are further extended frontwardly and rearwardly from the extended and lowered frame arrangement to further lower the center of gravity of the motorcycle.

Another advantage of the invention is to provide the extended and lowered frame arrangement, wherein the engine is re-arranged to further lower the center of gravity of the motorcycle.

Another advantage of the invention is to provide the extended and lowered frame arrangement, which provides a three-point support for the engine to rigidly support the engine by the extended and lowered frame arrangement.

Another advantage of the invention is to provide the extended and lowered frame arrangement, wherein the widened hub assembly provides multiple functions of serving as a rear wheel supporting axle for supporting the rear wheel away from the rear portion of the extended and lower frame arrangement and serving as an engine transmission output shaft for driving the rear wheel to rotate directly.

Another advantage of the invention is to provide the extended and lowered frame arrangement, wherein the gas tank supported on the floorboard and protected by the gas tank protection frame to allow the rider to step thereon and to prevent the gas tank from being damaged by any external force.

Another advantage of the invention is to provide the extended and lowered frame arrangement, wherein the thermal insulation cover is provided under the seat frame to thermally insulate heat from the engine to the seat frame and to receive a wiring system of the power generator.

Another advantage of the invention is to provide the extended and lowered frame arrangement, wherein the rear wheel is widened as a race inspired tire by outwardly and opposedly extending two slanted decorative surfaces from the flat usable surface. The widen rear wheel is incorporated with the widen hub assembly to enhance the acceleration of the motorcycle while being fuel effective.

Another advantage of the invention is to provide the extended and lowered frame arrangement, wherein the side mirrors are outwardly extended from two outer ends of the handlebars to provide a better side viewing angle for the rider and to minimize the diameter of each of the side mirrors without reducing the viewing area for the rider.

Another advantage of the invention is to provide the extended and lowered frame arrangement, which does not require altering the original structural design of the motorcycle, so as to minimize the manufacturing cost of the motorcycle components incorporating with the extended and lowered frame arrangement.

Another advantage of the invention is to provide the extended and lowered frame arrangement, wherein no expensive or complicated structure is required to employ in the present invention in order to achieve the above mentioned objects. Therefore, the present invention successfully provides an economic and efficient solution for providing a rigid frame configuration for the motorcycle.

Another advantage of the invention is to provide the extended and lowered frame arrangement, wherein all the components can be easily assembled to the extended and lower frame arrangement so as to simplify the structural configuration of the motorcycle.

Additional advantages and features of the invention will become apparent from the description which follows, and may be realized by means of the instrumentalities and combinations particular point out in the appended claims.

According to the present invention, the foregoing and other objects and advantages are attained by a motorcycle, comprising:

an extended and lowered frame arrangement which comprises a supporting frame having a front portion, a rear portion, and a floorboard extended between the front portion and the rear portion;

a steering assembly operatively mounted at the front portion of the supporting frame;

a front wheel assembly which comprises two spaced apart front forks, a front wheel rotatably coupled between the front forks, and a front wheel extension member having a rear portion coupled at a bottom portion of the steering assembly and a front portion coupled at the front forks to frontwardly extend a distance between the front portion of the supporting frame and the front wheel;

a power generator which comprises an engine securely supported underneath the rear portion of the supporting frame to lower a center of gravity of the supporting frame; and a rear wheel assembly which comprises a rear wheel supported away from the rear portion of the supporting frame and driven to rotate by the engine, wherein the front wheel and the rear wheel are shifted far from the supporting frame to lengthen a distance between the front wheel and the rear wheel so as to further lower a center of gravity of the extended and lowered frame arrangement.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
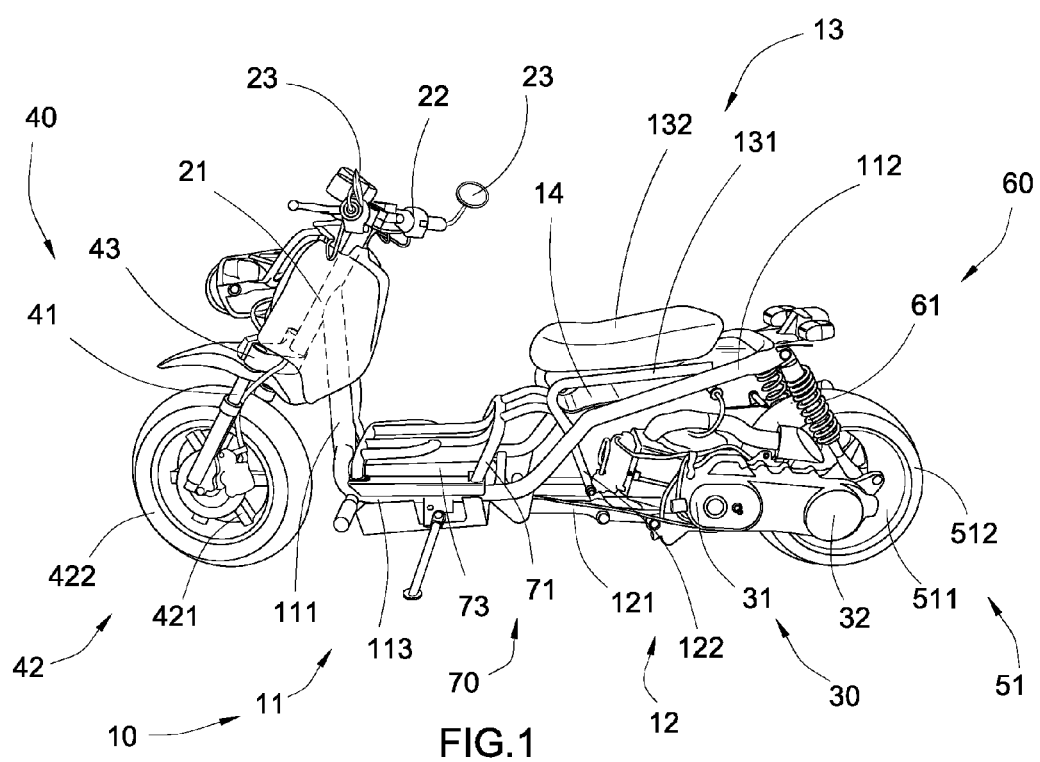
FIG. 1 is a side view of a motorcycle according to a first preferred embodiment of the present invention.

Referring to FIG. 1, a motorcycle, especially for a scooter, according to a first preferred embodiment of the present invention is illustrated, wherein the motorcycle comprises an extended and lowered frame arrangement 10, a steering assembly 20, a power generator 30, a front wheel assembly 40, and a rear wheel assembly 50.

Figure 2:
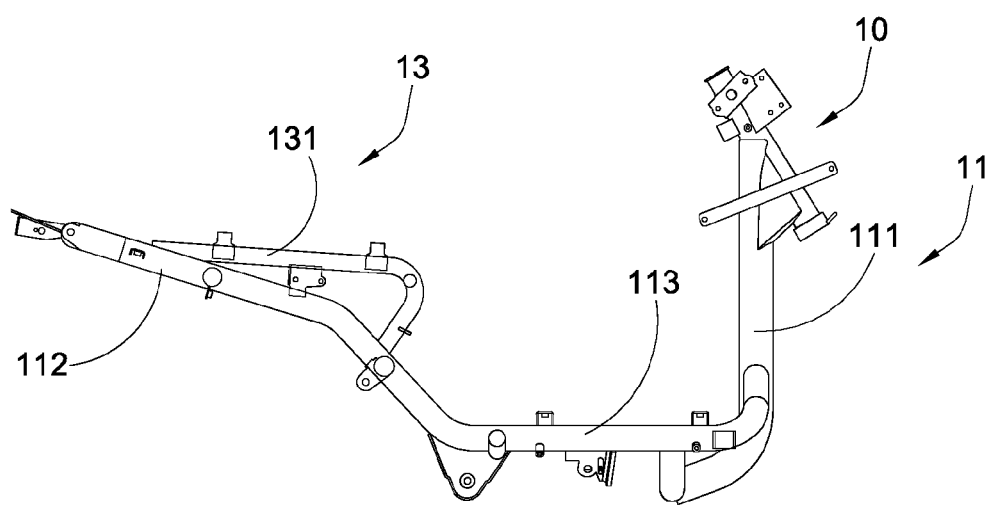
FIG. 2 is a side view of an extended and lowered frame arrangement of the motorcycle according to the above first preferred embodiment of the present invention.

As shown in FIG. 2, the extended and lowered frame arrangement 10 comprises a supporting frame 11 having a front portion 111, a rear portion 112, and a floorboard 113 extended between the front portion 111 and the rear portion 112. Accordingly, the orientation of the floorboard 113 is lower than that of the front portion 111 and the rear portion 112.

The steering assembly 20 is operatively mounted at the front portion 111 of the supporting frame 11, wherein the steering assembly 20 comprises a steering shaft 21 rotatably coupled at the front portion 111 of the supporting frame 11 and two handlebars 22 extended from the steering shaft 21 for controllably steering the front wheel assembly 40. In addition, the steering assembly 20 further comprises two side mirrors 23 outwardly extended from two outer ends of the handlebars 22. Accordingly, the conventional side mirrors are upwardly extended along the handlebars, the viewing angle of each of the conventional side mirrors may be blocked by the rider's body. Therefore, the diameter size of the conventional side mirror must be enlarged to increase the viewing area for the rider. Since the two side mirrors 23 of the present invention can be further extended sidewardly with respect to a centerline of the extended and lowered frame arrangement 10, the side mirrors 23 provide a better side viewing angle for the rider. Furthermore, the diameter of each of the side mirrors 23 can be minimized without reducing the viewing area for the rider.

The power generator 30 comprises an engine 31 securely supported underneath the rear portion 112 of the supporting frame 11 to lower a center of gravity of the supporting frame 11.

Figure 4:
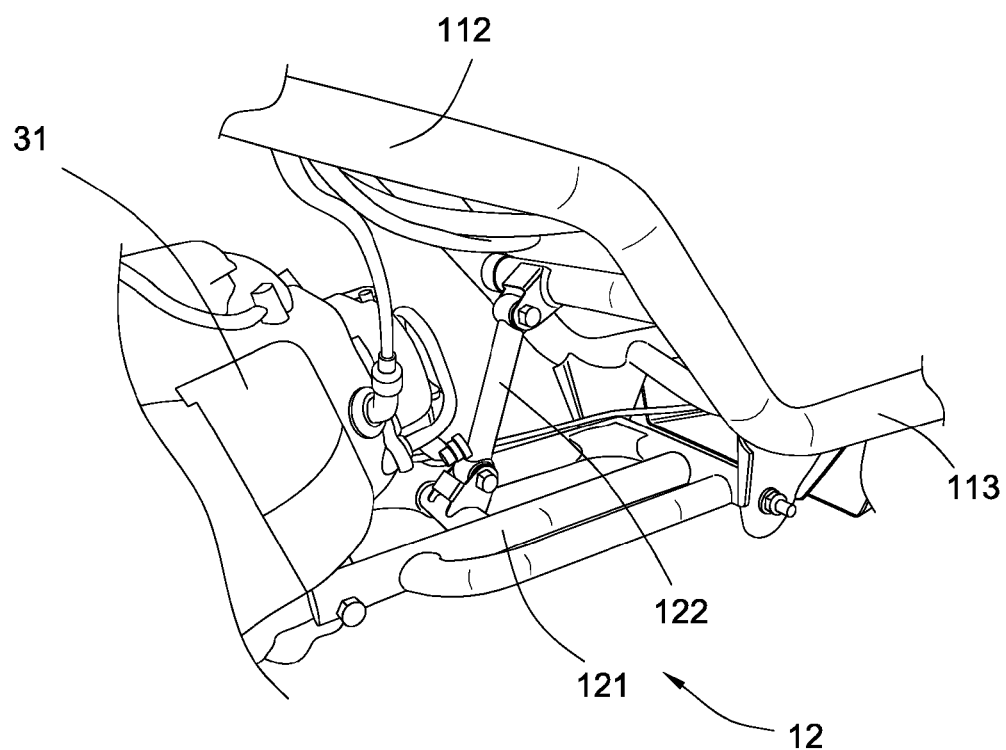
FIG. 4 is a perspective view of an engine mounting frame of the motorcycle according to the above first preferred embodiment of the present invention.

In order to rigidly support the engine 31 underneath the supporting frame 11, the extended and lower frame arrangement 10 further comprises an engine mounting frame 12 rearwardly extended from the floorboard to support the engine 31, as shown in FIG. 4, such that the engine 31 is securely on the engine mounting frame 12 at a position below the rear portion 112 of the supporting frame 11.

In particular, the engine mounting frame 12 comprises an engine platform 121 rearwardly extended from the floorboard 113 to support the engine 31 on the engine platform 121 and an engine reinforcing arm 122 downwardly and rearwardly extended from the rear portion 112 of the supporting frame 11 to the engine platform 121 to enable a weight of the engine 31 to be evenly distributed to the supporting frame 11. Accordingly, when the engine 31 is mounted on the engine platform 121, the weight of the engine 31 will be distributed to the floorboard 113 of the supporting frame 11. The engine reinforcing arm 122 will then distribute the weight of the engine 31 to the rear portion 112 of the supporting frame 11.

As shown in FIG. 1, the extended and lowered frame arrangement 10 further comprises a seat frame 13 mounted above the rear portion 112 of the supporting frame 11, wherein the seat frame 13 comprises a seat support 131 upwardly extended from the rear portion 112 of the supporting frame 11 and a seat pad 132 mounted on the seat support 131. Accordingly, the seat support 131 has a generally U-shaped configuration mounted on the rear portion 112 of the supporting frame 11. Since the seat frame 13 is located above the engine 31, the heat from the engine 31 will transmit to the seat frame 13. Therefore, the extended and lowered frame arrangement 10 further comprises a thermal insulation cover 14 provided under the seat frame 13 to thermally insulate the heat from the engine 31 to the seat frame 13. Furthermore, the thermal insulation cover 14, having an insulated cavity 141, mounted at the rear portion 112 of the supporting frame 11 at a position above the engine 31, such that a wiring system of the power generator 30 can be received in the insulated cavity 141 of the thermal insulation cover 14. The wiring system can be the electrical cables, braking wires, and/or other electronic components of the power generator 30.

Figure 3:
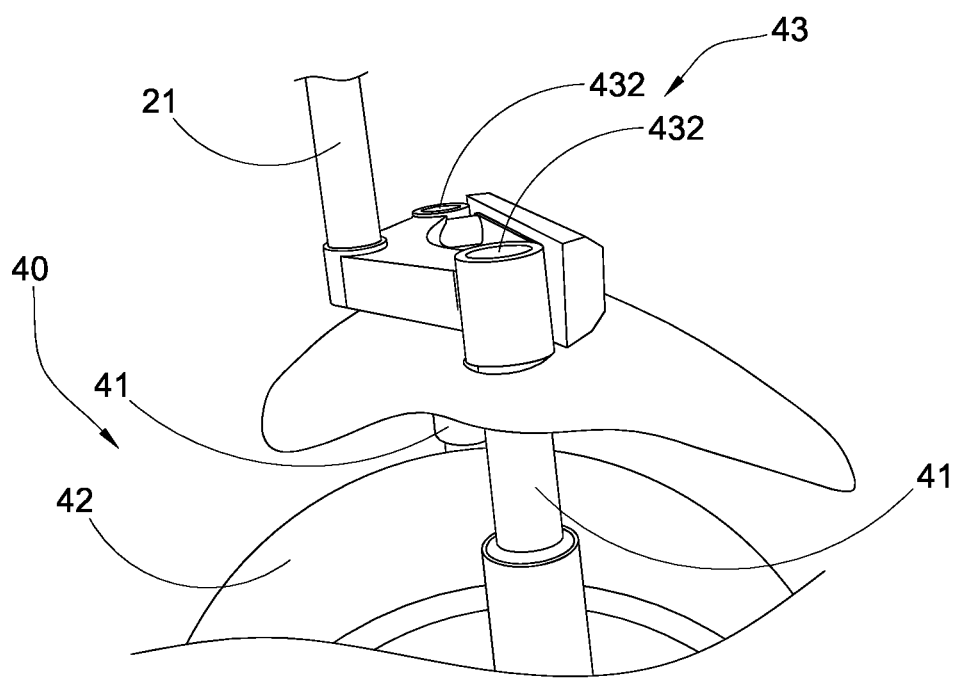
FIG. 3 is a perspective view of a front wheel extension member of the motorcycle according to the above first preferred embodiment of the present invention.

As shown in FIGS. 1 and 3, the front wheel assembly 40 comprises two spaced apart front forks 41, a front wheel 42 rotatably coupled between the front forks 41, and a front wheel extension member 43 having a rear portion coupled at a bottom portion of the steering assembly 20 and a front portion coupled at the front forks 41 to frontwardly extend a distance between the front portion of the supporting frame 11 and the front wheel 42. According to the preferred embodiment, the front wheel extension member 43 has a V-shaped configuration defining a rear end portion 431 to couple with a bottom end portion of the steering shaft 21 of the steering assembly 20 and two front end portions 432 to couple with the upper end portions of the front forks 41 respectively. Therefore, through the length of the front wheel extension member 43, the front wheel 42 can be further shifted forward to lengthen the distance between the front portion 111 of the supporting frame 11 and the front wheel 42, so as to enhance the handling of the motorcycle.

The front wheel 42 comprises a front wheel rim 421 operatively coupled between the front forks 41 and a front wheel tire 422 encircling around the front wheel rim 421. Accordingly, the bottom ends of the front forks 41 are operatively coupled at the center of front wheel rim 421 at two sides thereof.

The rear wheel assembly 50 comprises a rear wheel 51 supported away from the rear portion 112 of the supporting frame 11 and driven to rotate by the engine 31, wherein the rear wheel 51 is further shifted rearward to lengthen the distance between the rear portion 112 of the supporting frame 11 and the rear wheel 51. Therefore, the front wheel 42 and the rear wheel 51 are shifted far from the supporting frame 11 to lengthen a distance between the front wheel 42 and the rear wheel 51 so as to further lower a center of gravity of the extended and lowered frame arrangement 10. Preferably, a center of the rear wheel 51 is located behind the rear end of the supporting frame 11 to lengthen the distance between the rear portion 112 of the supporting frame 11 and the rear wheel 51. Accordingly, the rear wheel 51 comprises a rear wheel rim 511 operatively linked to the power generator 30 and a rear wheel tire 512 encircling around the rear wheel rim 511.

Figure 9:
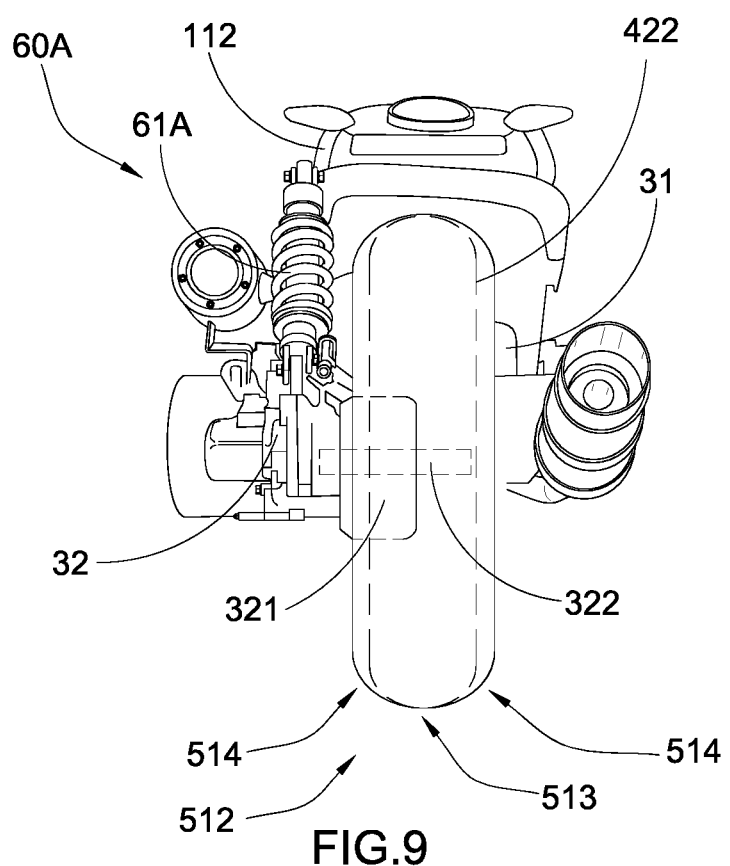
FIG. 9 is a rear view of the motorcycle according to the above second preferred embodiment of the present invention.

As shown in FIGS. 1 and 9, the power generator 30 further comprises a widened hub assembly 32 operatively linked to the engine 31 for generating a rotational power, wherein the widened hub assembly 32 is operatively coupled to the rear wheel 51 to serve as a rear wheel supporting axle for supporting the rear wheel 51 away from the rear portion 112 of the supporting frame 11 and to serve as an engine transmission output shaft for driving the rear wheel 51 to rotate directly.

According to the preferred embodiment, the widened hub assembly 32 comprises a hub member 321 integrally and sidewardly extended from the center of the rear wheel rim 511 and a rear wheel driving shaft 322 extended from the hub member 321, wherein when the engine 31 generates the rotational power, the rotational power will transmit to the rear wheel driving shaft 322 of the widened hub assembly 32 to directly drive the rear wheel 51 to rotate. It is worth mentioning that since the hub member 321 is integrated with the rear wheel rim 511 to increase the dimensional size of the hub member 321, the rear wheel 51 can be rigidly supported by the widened hub assembly 32.

As shown in FIG. 9, the rear wheel tire 512 has a flat usable surface 513 and two slanted decorative surfaces 514 outwardly and opposedly extended from the flat usable surface 513 to widen the rear wheel tire 512 as a race inspired tire. In other words, the rear wheel tire 512 is widened to give a rugged and sporty outlook and appearance. In addition, since the rear wheel tire 512 is widened, the width of the rear wheel rim 511 must be increased to fit the rear wheel tire 512. Therefore, the rear wheel assembly 50 provides enough space for the hub member 321 of the widened hub assembly 32 extending therefrom. In other words, the width of the hub member 321 can be maximized to provide enough strength to support the rear wheel 51. It is worth mentioning that a width of the front wheel tire 422 approximately equals to a width of the flat usable surface 513 of the rear wheel tire 51. Even though the rear wheel tire 51 is widened, only the flat usable surface 513 of the rear wheel tire 51 will contact with the road surface, so as to enhance the acceleration of the motorcycle while being fuel effective.

As shown in FIG. 1, the motorcycle further comprises a suspension assembly 60 which comprises at least a suspension arm 61 directly extended from the rear portion 112 of the supporting frame 11 to the rear wheel assembly 50 for absorbing vibration from the rear wheel 51 and the engine 31. According to the preferred embodiment, two spaced apart suspension arms 61 are coupled between the supporting frame 11 and the rear wheel assembly 50. In particular, an upper end of each of the suspension arms 61 is coupled at the rear portion 112 of the supporting frame 11 and a lower end of each of the suspension arms 61 is coupled at the widened hub assembly 32. Therefore, the vibration from the rear wheel 51 will be directly absorbed by the suspension arms 61. In addition, the vibration of the engine 31 through the widened hub assembly 32 will also be absorbed by the suspension arm 61.

It is worth mentioning that the engine 31 is substantially supported by the engine mounting frame 12, the widened hub assembly 32, and the suspension arms 61, such that the present invention provides a three-point support for the engine 31.

Figure 5:
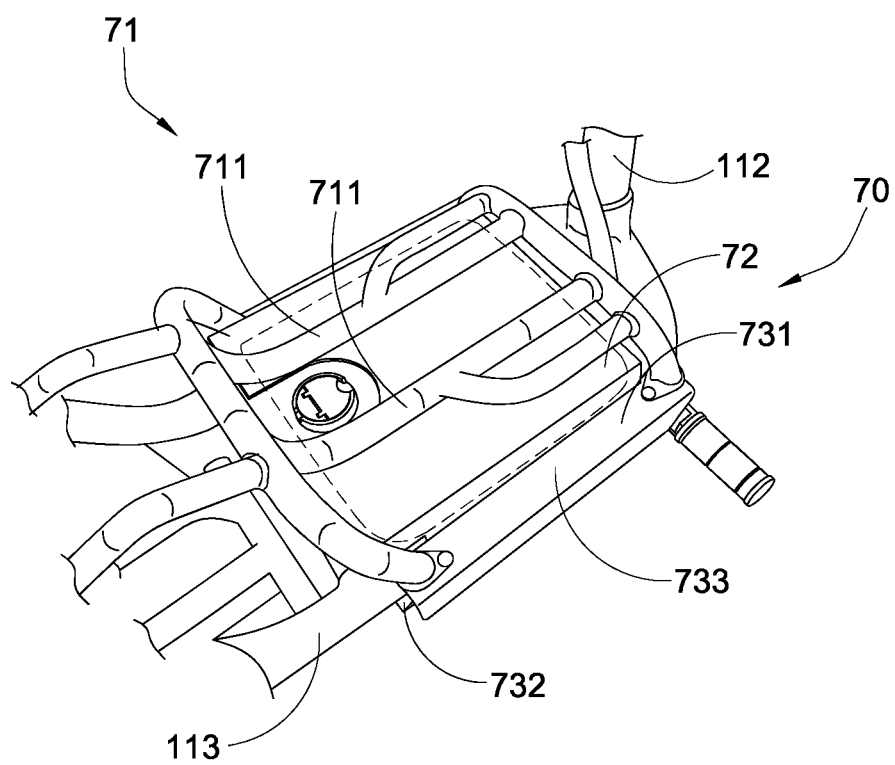
FIG. 5 is a perspective view of a gas tank assembly of the motorcycle according to the above first preferred embodiment of the present invention.

According to the preferred embodiment, the motorcycle further comprises a power assembly provided on said floorboard 113 and operatively linked to the engine 31 as a power supply, wherein said power assembly is a gas tank assembly 70 supported on the floorboard 113 of the supporting frame 11. In particular, the gas tank assembly 70 comprises a gas tank 72 supported on the floorboard 113 of the supporting frame 11 and operatively linked to the engine 31 as a fuel supply, and a gas tank protection frame 71 upwardly extended from the floorboard 113 to form a protection cavity to receive the gas tank 72 therein so as to protect the gas tank 72 from direct impact thereto. As shown in FIG. 5, the gas tank protection frame 71, which forms a grid-like configuration, has an upper grid cover 711 cover on top of the gas tank 72, wherein a space is formed between the top side of the gas tank 72 and a bottom side of the grid cover 711, such that the rider is able to step on the grid cover 711 of the gas tank protection frame 71 without damaging the gas tank 72.

Preferably, the gas tank assembly 70 further comprises a gas tank protection casing 73 to receive the gas tank 72 therein, wherein the gas tank protection casing 73 comprises an upper casing 731 and a lower casing 732 coupled with each other to receive the gas tank 72 and a mounting rim 733 outwardly extended from the gas tank protection casing 73 to mount on the floorboard 113 of the supporting frame 11. Therefore, the gas tank 72 can be securely mounted on the floorboard 113 of the supporting frame 11 and can be protected by the gas tank protection frame 71 and the gas tank protection casing 73.

Figure 6:
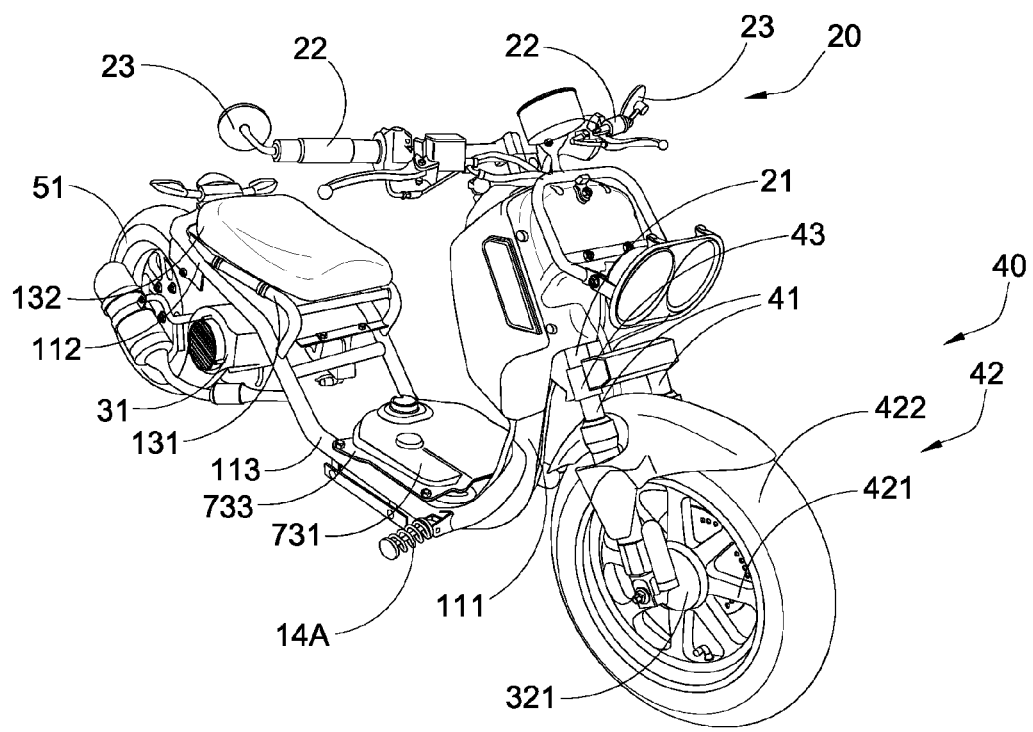
FIG. 6 is a perspective view of a motorcycle according to a second preferred embodiment of the present invention.
Figure 7:
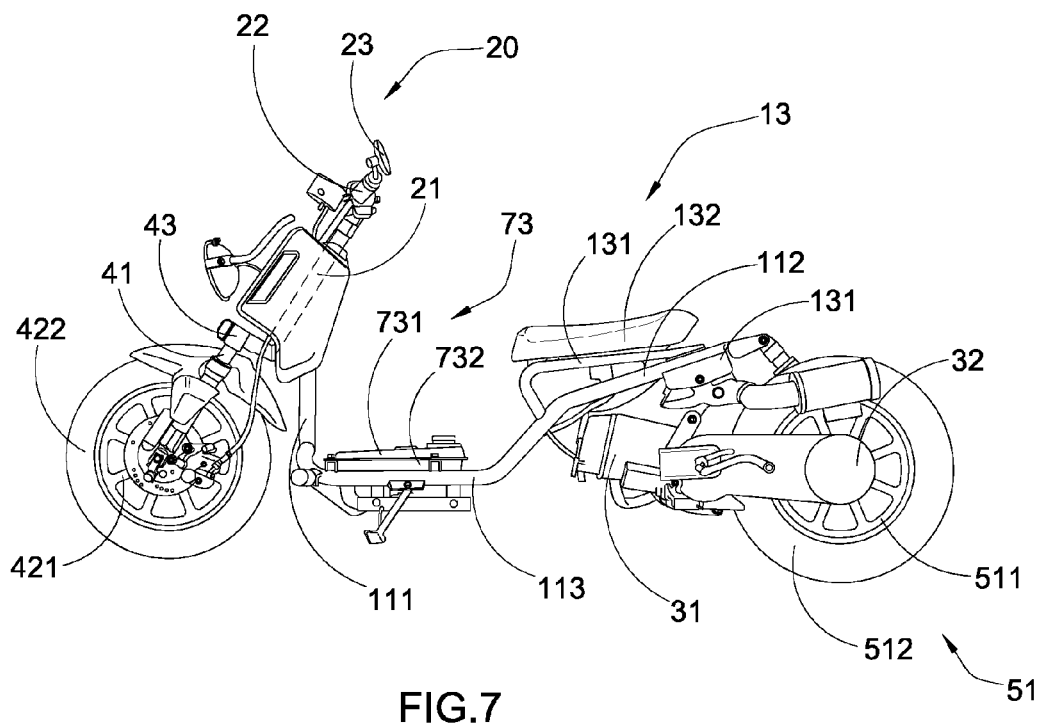
FIG. 7 is a side view of the motorcycle according to the above second preferred embodiment of the present invention.

As shown in FIGS. 6 and 7, a motorcycle according to a second embodiment of the present invention illustrates an alternative mode of the first embodiment, wherein the motorcycle of the second embodiment has the same structural configuration of the first embodiment, except the engine mounting frame 12A.

The engine mounting frame 12A is rearwardly extended from the rear portion 112 of the supporting frame 11 to support the engine 31 thereunder in a suspended manner, such that the engine 31 is secured by the engine mounting frame 12A at a position close to the rear portion 112 of the supporting frame 11. Accordingly, the engine mounting frame 12A comprises an engine platform 121A downwardly extended from the rear portion 112 of the supporting frame 11 and an engine reinforcing arm 122A downwardly and rearwardly extended from the engine platform 121A to couple the engine 31 at a center of gravity thereof to enable the engine 31 to be stably suspended under the supporting frame 11. In other words, the engine 31 is upwardly lifted by the engine reinforcing arm 122A to suspendedly support under the rear portion 112 of the supporting frame 11. As a result, the extended and lowered frame arrangement 10 can be further lowered its center of gravity due to the uplifted engine 31.

Figure 8:
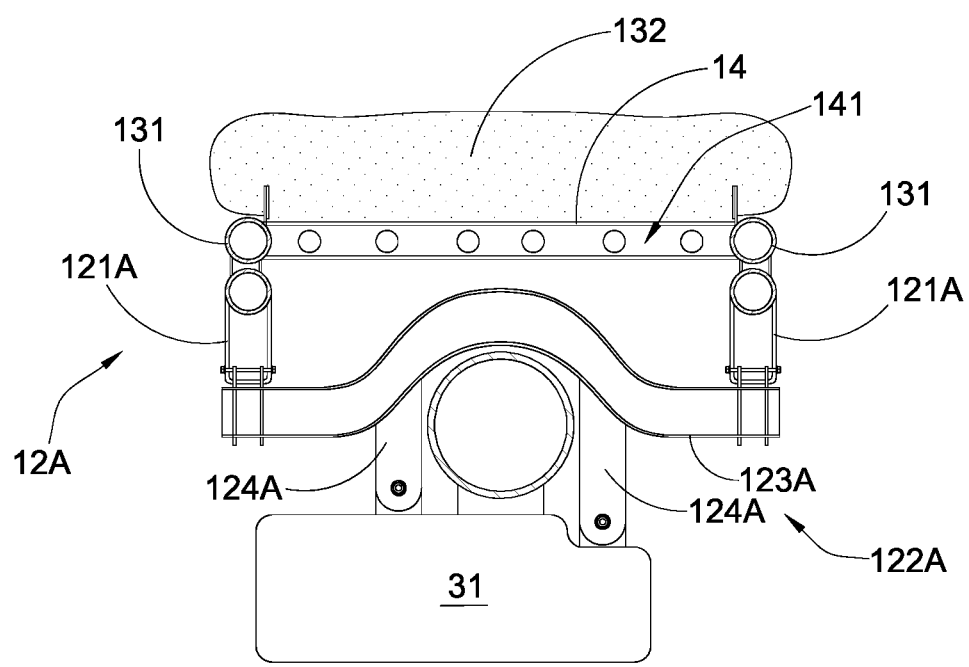
FIG. 8 is a rear view of an engine mounting frame of the motorcycle according to the above second preferred embodiment of the present invention.

As shown in FIG. 8, the engine reinforcing arm 122A has an arm connecting portion 123A formed in an Omega shape "Ω" and two elongated arm suspending portions 124A spacedly and downwardly extended from the arm connecting portion 123A to couple with the engine 31. In particular, the arm connecting portion 123A has a mid-curving configuration, wherein an exhaust pipe of the engine 31 passes through the mid curving configuration arm connecting portion 123A when the engine 31 is suspendedly supported by the arm suspending portions 124A.

According to the second embodiment, the suspension assembly 60A comprises one suspension arm 61A directly extended from the rear portion 112 of the supporting frame 11 to the rear wheel assembly 50 for absorbing vibration from the rear wheel 51 and the engine 31. In particular, an upper end of the suspension arm 61A is coupled at the rear portion 112 of the supporting frame 11 and a lower end of the suspension arm 61A is coupled at the widened hub assembly 32. Therefore, the vibration from the rear wheel 51 will be directly absorbed by the suspension arm 61A. In addition, the vibration of the engine 31 through the widened hub assembly 32 will also be absorbed by the suspension arm 61A. It is worth mentioning that the engine 31 is substantially supported by the engine mounting frame 12A, the widened hub assembly 32, and the suspension arms 61, such that the present invention provides a three-point support for the engine 31.

Figure 10:
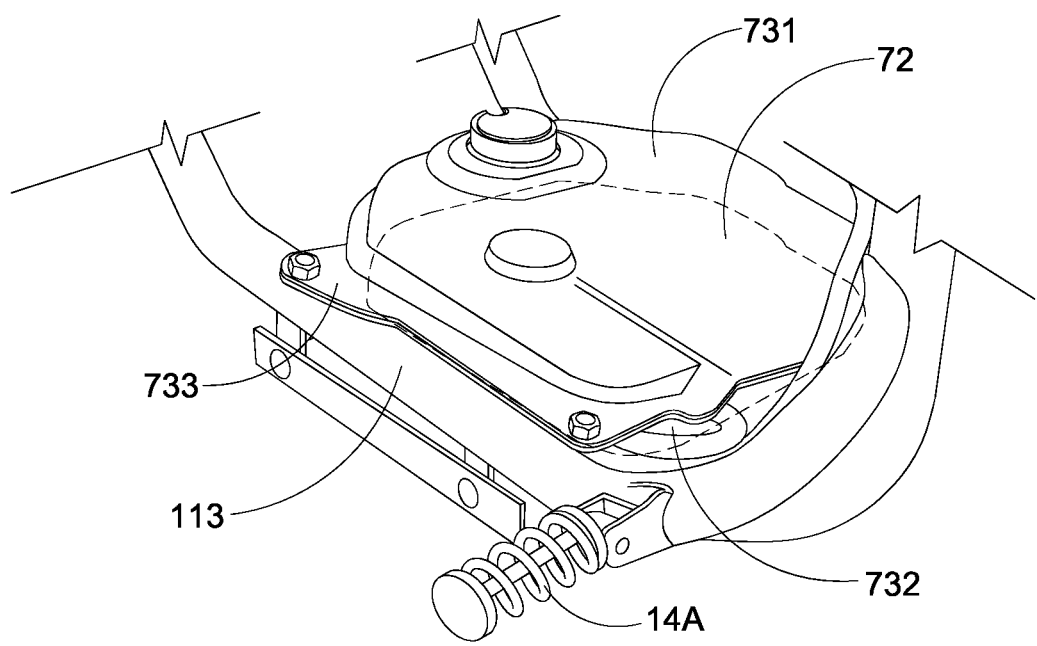
FIG. 10 is a perspective view of a gas tank assembly of the motorcycle according to the above second preferred embodiment of the present invention.

The extended and lowered frame arrangement 10 further comprises two foldable footsteps 14A foldably coupled at two sides of the floorboard 113 of the supporting frame 11, as shown in FIG. 10. Preferably the foldable footsteps 14A are pivotally coupled at the sides of the floorboard 113 of the supporting frame 11. It is worth mentioning that the gas tank protection frame 71 can be omitted in the second embodiment since the rider can step on the foldable footsteps 14A instead of the gas tank protection frame 71.

According to the present invention, the center of gravity of the motorcycle can be further lowered by increasing the distance between the front wheel 42 and the rear wheel 51, and by keeping the engine 31 close to the rear portion 112 of the supporting frame 11. In addition, the engine 31 is rigidly supported by the supporting frame 11 via the three-point support and is easy to detach from the supporting frame 11.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A motorcycle, comprising:
an extended and lowered frame arrangement which comprises a supporting frame having a front portion, a rear portion, and a floorboard extended between said front portion and said rear portion, and an engine mounting frame extended from said supporting frame, wherein an orientation of said floorboard is lower than that of said front portion and said rear portion;
a steering assembly operatively mounted at said front portion of said supporting frame;
a front wheel assembly which comprises two spaced apart front forks, a front wheel rotatably coupled between said front forks, and a front wheel extension member having a rear portion coupled at a bottom portion of said steering assembly and a front portion coupled at said front forks to frontwardly extend a distance between said front portion of said supporting frame and said front wheel;
a power generator which comprises an engine, said engine mounting frame of said extended and lowered frame arrangement securely supporting said engine underneath said rear portion of said supporting frame to lower a center of gravity of said supporting frame;
a rear wheel assembly which comprises a rear wheel supported away from said rear portion of said supporting frame and driven to rotate by said engine, wherein said rear wheel is shifted rearward until a center of said rear wheel is located behind a rear end of said supporting frame to lengthen a distance between said rear portion of said supporting frame and said rear wheel, wherein said front wheel and said rear wheel are both shifted far from said supporting frame to lengthen a distance between said front wheel and said rear wheel so as to lower a center of gravity of said extended and lowered frame arrangement and said power generator;
a suspension assembly comprising at least a suspension arm extended from said supporting frame to said rear wheel assembly for absorbing vibration from said rear wheel and said engine;
a seat frame, which is mounted above said rear portion of said supporting frame, comprising a seat support upwardly extended from said rear portion of said supporting frame and a seat pad provided on said seat support, wherein said seat support has a generally U-shaped configuration mounted on said rear portion of said supporting frame to support said seat support thereon; and a power assembly, provided on said floorboard of said supporting frame and operatively linked to said engine as a power supply, being a gas tank assembly which comprises a gas tank supported on said floorboard of said supporting frame and operatively linked to said engine as a fuel supply and a gas tank protection frame extended from said floorboard to form a protection cavity to receive said gas tank therein so as to protect said gas tank, wherein said gas tank protection frame, having a grid-like configuration, has an upper grid cover covering on top of said gas tank while a space is formed between a top side of said gas tank and a bottom side of said grid cover.

2. The motorcycle, as recited in claim 1, wherein said steering assembly comprises a steering shaft rotatably coupled at said front portion of said supporting frame, wherein said front wheel extension member has a V-shaped configuration defining a rear end portion to couple with a bottom end portion of said steering shaft of said steering assembly and two front end portions to couple with upper end portions of said front forks respectively, so as to shift said front wheel forward to lengthen the distance between said front portion of said supporting frame and said front wheel.

3. The motorcycle, as recited in claim 1, wherein said engine mounting frame comprises an engine platform rearwardly extended from said floorboard to support said engine thereon and an engine reinforcing arm downwardly and rearwardly extended from said rear portion of said supporting frame to said engine platform to enable a weight of said engine to be distributed to said supporting frame via said engine platform and said engine reinforcing arm.

4. The motorcycle, as recited in claim 2, wherein said engine mounting frame comprises an engine platform rearwardly extended from said floorboard to support said engine thereon and an engine reinforcing arm downwardly and rearwardly extended from said rear portion of said supporting frame to said engine platform to enable a weight of said engine to be distributed to said supporting frame via said engine platform and said engine reinforcing arm.

5. The motorcycle, as recited in claim 1, wherein said rear wheel comprises a rear wheel rim operatively linked to said power generator and a rear wheel tire encircling around said rear wheel rim, wherein said power generator further comprises a widened hub assembly operatively linked to said engine, which is operatively coupled to said rear wheel to serve as a rear wheel supporting axle for supporting said rear wheel away from said rear portion of said supporting frame and to serve as an engine transmission output shaft for driving said rear wheel to rotate, wherein said widened hub assembly comprises a hub member integrally and sidewardly extended from a center of said rear wheel rim and a rear wheel driving shaft extended from said hub member, wherein when said engine generates a rotational power, said rotational power is transmitted to said rear wheel driving shaft of said widened hub assembly to drive said rear wheel to rotate, while said rear wheel is rigidly supported by said widened hub assembly because said hub member is integrated with said rear wheel rim to increase a dimensional size of said hub member.

6. The motorcycle, as recited in claim 4, wherein said rear wheel comprises a rear wheel rim operatively linked to said power generator and a rear wheel tire encircling around said rear wheel rim, wherein said power generator further comprises a widened hub assembly operatively linked to said engine, which is operatively coupled to said rear wheel to serve as a rear wheel supporting axle for supporting said rear wheel away from said rear portion of said supporting frame and to serve as an engine transmission output shaft for driving said rear wheel to rotate, wherein said widened hub assembly comprises a hub member integrally and sidewardly extended from a center of said rear wheel rim and a rear wheel driving shaft extended from said hub member, wherein when said engine generates a rotational power, said rotational power is transmitted to said rear wheel driving shaft of said widened hub assembly to drive said rear wheel to rotate, while said rear wheel is rigidly supported by said widened hub assembly because said hub member is integrated with said rear wheel rim to increase a dimensional size of said hub member.

7. The motorcycle, as recited in claim 6, wherein said rear wheel tire has a flat usable surface for contacting with a road surface and two slanted decorative surfaces outwardly and opposedly extended from said flat usable surface, adapted for not contacting with the road surface, to merely widen said rear wheel tire so as to fit with said hub member of said widened hub assembly extending therefrom to maximize a width of said hub member to strengthen the support of said rear wheel.

8. The motorcycle, as recited in claim 1, wherein said engine mounting frame is rearwardly extended from said rear portion of said supporting frame to support said engine in a suspended manner in such a manner that said engine is secured by said engine mounting frame at a position close to said rear portion of said supporting frame, wherein said engine is upwardly lifted by said engine mounting frame to suspendedly support under said rear portion of said supporting frame so as to lowered the center of gravity of said extended and lowed frame arrangement, wherein said engine mounting frame comprises an engine platform downwardly extended from said rear portion of said supporting frame and an engine reinforcing arm downwardly and rearwardly extended from said engine platform to couple said engine at the center of gravity thereof to enable said engine to be stably suspended under said supporting frame.

9. The motorcycle, as recited in claim 2, wherein said engine mounting frame is rearwardly extended from said rear portion of said supporting frame to support said engine in a suspended manner in such a manner that said engine is secured by said engine mounting frame at a position close to said rear portion of said supporting frame, wherein said engine is upwardly lifted by said engine mounting frame to suspendedly support under said rear portion of said supporting frame so as to lowered the center of gravity of said extended and lowed frame arrangement, wherein said engine mounting frame comprises an engine platform downwardly extended from said rear portion of said supporting frame and an engine reinforcing arm downwardly and rearwardly extended from said engine platform to couple said engine at the center of gravity thereof to enable said engine to be stably suspended under said supporting frame.

10. The motorcycle, as recited in claim 9, wherein said rear wheel comprises a rear wheel rim operatively linked to said power generator and a rear wheel tire encircling around said rear wheel rim, wherein said power generator further comprises a widened hub assembly operatively linked to said engine, which is operatively coupled to said rear wheel to serve as a rear wheel supporting axle for supporting said rear wheel away from said rear portion of said supporting frame and to serve as an engine transmission output shaft for driving said rear wheel to rotate, wherein said widened hub assembly comprises a hub member integrally and sidewardly extended from a center of said rear wheel rim and a rear wheel driving shaft extended from said hub member, wherein when said engine generates a rotational power, said rotational power is transmitted to said rear wheel driving shaft of said widened hub assembly to drive said rear wheel to rotate, while said rear wheel is rigidly supported by said widened hub assembly because said hub member is integrated with said rear wheel rim to increase a dimensional size of said hub member.

11. The motorcycle, as recited in claim 10, wherein said rear wheel tire has a flat usable surface for contacting with a road surface and two slanted decorative surfaces outwardly and opposedly extended from said flat usable surface, adapted for not contacting with the road surface, to merely widen said rear wheel tire so as to fit with said hub member of said widened hub assembly extending therefrom to maximize a width of said hub member to strengthen the support of said rear wheel.

12. The motorcycle, as recited in claim 5, wherein said suspension assembly comprises two spaced apart suspension arms which are coupled between said supporting frame and said rear wheel assembly, wherein an upper end of each of said suspension arms is coupled at said rear portion of said supporting frame and a lower end of each of said suspension arms is coupled at said widened hub assembly.

13. The motorcycle, as recited in claim 7, wherein said suspension assembly comprises two spaced apart suspension arms which are coupled between said supporting frame and said rear wheel assembly, wherein an upper end of each of said suspension arms is coupled at said rear portion of said supporting frame and a lower end of each of said suspension arms is coupled at said widened hub assembly.

14. The motorcycle, as recited in claim 5, wherein said suspension arm is extended from said rear portion of said supporting frame to said rear wheel assembly, wherein an upper end of said suspension arm is coupled at said rear portion of said supporting frame and a lower end of said suspension arm is coupled at said widened hub assembly.

15. A motorcycle, comprising:
an extended and lowered frame arrangement which comprises a supporting frame having a front portion, a rear portion, and a floorboard extended between said front portion and said rear portion, and an engine mounting frame extended from said supporting frame, wherein an orientation of said floorboard is lower than that of said front portion and said rear portion;
a steering assembly operatively mounted at said front portion of said supporting frame, wherein said steering assembly comprises a steering shaft rotatably coupled at said front portion of said supporting frame;
a front wheel assembly which comprises two spaced apart front forks, a front wheel rotatably coupled between said front forks, and a front wheel extension member having a rear portion coupled at a bottom portion of said steering assembly and a front portion coupled at said front forks to frontwardly extend a distance between said front portion of said supporting frame and said front wheel, wherein said front wheel extension member has a V-shaped configuration defining a rear end portion to couple with a bottom end portion of said steering shaft of said steering assembly and two front end portions to couple with upper end portions of said front forks respectively, so as to shift said front wheel forward to lengthen the distance between said front portion of said supporting frame and said front wheel;
a power generator which comprises an engine, said engine mounting frame of said extended and lowered frame arrangement securely supporting said engine underneath said rear portion of said supporting frame to lower a center of gravity of said supporting frame;
a rear wheel assembly which comprises a rear wheel supported away from said rear portion of said supporting frame and driven to rotate by said engine, wherein said rear wheel is shifted rearward until a center of said rear wheel is located behind a rear end of said supporting frame to lengthen a distance between said rear portion of said supporting frame and said rear wheel, wherein said front wheel and said rear wheel are both shifted far from said supporting frame to lengthen a distance between said front wheel and said rear wheel so as to lower a center of gravity of said extended and lowered frame arrangement and said power generator;
a suspension assembly comprising at least a suspension arm extended from said supporting frame to said rear wheel assembly for absorbing vibration from said rear wheel and said engine;
a seat frame, which is mounted above said rear portion of said supporting frame, comprising a seat support upwardly extended from said rear portion of said supporting frame and a seat pad provided on said seat support, wherein said seat support has a generally U-shaped configuration mounted on said rear portion of said supporting frame to support said seat support thereon; and
a power assembly provided on said floorboard of said supporting frame and operatively linked to said engine as a power supply.

16. A motorcycle, comprising:
an extended and lowered frame arrangement which comprises a supporting frame having a front portion, a rear portion, and a floorboard extended between said front portion and said rear portion, and an engine mounting frame extended from said supporting frame, wherein an orientation of said floorboard is lower than that of said front portion and said rear portion;
a steering assembly operatively mounted at said front portion of said supporting frame;
a front wheel assembly which comprises two spaced apart front forks, a front wheel rotatably coupled between said front forks, and a front wheel extension member having a rear portion coupled at a bottom portion of said steering assembly and a front portion coupled at said front forks to frontwardly extend a distance between said front portion of said supporting frame and said front wheel;
a power generator which comprises an engine, said engine mounting frame of said extended and lowered frame arrangement securely supporting said engine underneath said rear portion of said supporting frame to lower a center of gravity of said supporting frame;
a rear wheel assembly which comprises a rear wheel supported away from said rear portion of said supporting frame and driven to rotate by said engine, wherein said rear wheel is shifted rearward until a center of said rear wheel is located behind a rear end of said supporting frame to lengthen a distance between said rear portion of said supporting frame and said rear wheel, wherein said front wheel and said rear wheel are both shifted far from said supporting frame to lengthen a distance between said front wheel and said rear wheel so as to lower a center of gravity of said extended and lowered frame arrangement and said power generator;
a suspension assembly comprising at least a suspension arm extended from said supporting frame to said rear wheel assembly for absorbing vibration from said rear wheel and said engine;
a seat frame, which is mounted above said rear portion of said supporting frame, comprising a seat support upwardly extended from said rear portion of said supporting frame and a seat pad provided on said seat support, wherein said seat support has a generally U-shaped configuration mounted on said rear portion of said supporting frame to support said seat support thereon; and a power assembly provided on said floorboard of said supporting frame and operatively linked to said engine as a power supply, wherein said power assembly is a gas tank assembly which comprises a gas tank supported on said floorboard of said supporting frame and operatively linked to said engine as a fuel supply and a gas tank protection casing to receive said gas tank therein, wherein said gas tank protection casing comprises an upper casing and a lower casing coupled with each other to receive said gas tank and a mounting rim outwardly extended from said gas tank protection casing to mount on said floorboard of said supporting frame so as to securely mount and protected said gas tank on said floorboard of said supporting frame.

17. The motorcycle, as recited in claim 16, wherein said engine mounting frame is rearwardly extended from said rear portion of said supporting frame to support said engine in a suspended manner in such a manner that said engine is secured by said engine mounting frame at a position close to said rear portion of said supporting frame, wherein said engine is upwardly lifted by said engine mounting frame to suspendedly support under said rear portion of said supporting frame so as to lowered the center of gravity of said extended and lowed frame arrangement, wherein said engine mounting frame comprises an engine platform downwardly extended from said rear portion of said supporting frame and an engine reinforcing arm downwardly and rearwardly extended from said engine platform to couple said engine at the center of gravity thereof to enable said engine to be stably suspended under said supporting frame.

18. The motorcycle, as recited in claim 17, wherein said rear wheel comprises a rear wheel rim operatively linked to said power generator and a rear wheel tire encircling around said rear wheel rim, wherein said power generator further comprises a widened hub assembly operatively linked to said engine, which is operatively coupled to said rear wheel to serve as a rear wheel supporting axle for supporting said rear wheel away from said rear portion of said supporting frame and to serve as an engine transmission output shaft for driving said rear wheel to rotate, wherein said widened hub assembly comprises a hub member integrally and sidewardly extended from a center of said rear wheel rim and a rear wheel driving shaft extended from said hub member, wherein when said engine generates a rotational power, said rotational power is transmitted to said rear wheel driving shaft of said widened hub assembly to drive said rear wheel to rotate, while said rear wheel is rigidly supported by said widened hub assembly because said hub member is integrated with said rear wheel rim to increase a dimensional size of said hub member.

19. The motorcycle, as recited in claim 18, wherein said rear wheel tire has a flat usable surface for contacting with a road surface and two slanted decorative surfaces outwardly and opposedly extended from said flat usable surface, adapted for not contacting with the road surface, to merely widen said rear wheel tire so as to fit with said hub member of said widened hub assembly extending therefrom to maximize a width of said hub member to strengthen the support of said rear wheel.

20. The motorcycle, as recited in claim 19, wherein said suspension arm is extended from said rear portion of said supporting frame to said rear wheel assembly, wherein an upper end of said suspension arm is coupled at said rear portion of said supporting frame and a lower end of said suspension arm is coupled at said widened hub assembly.

* * * * *